(12) United States Patent
Ranta-Aho et al.

(10) Patent No.: US 7,606,205 B2
(45) Date of Patent: Oct. 20, 2009

(54) SYSTEM AND METHOD FOR PROVIDING SELECTION DIVERSITY FOR MULTICASTING CONTENT

(75) Inventors: Karri Ranta-Aho, Espoo (FI); Antti Toskala, Espoo (FI)

(73) Assignee: Nokia Corporation, Espoo (FI)

( * ) Notice: Subject to any disclaimer, the term of this patent is extended or adjusted under 35 U.S.C. 154(b) by 1122 days.

(21) Appl. No.: 10/281,200

(22) Filed: Oct. 28, 2002

(65) Prior Publication Data
US 2004/0081125 A1 Apr. 29, 2004

(51) Int. Cl.
*H04B 7/216* (2006.01)
(52) U.S. Cl. .................................. 370/335
(58) Field of Classification Search ......... 370/390–395, 370/312, 328, 334–338, 432, 218, 369, 331, 370/254, 310, 444, 455, 349, 436, 437, 332, 370/329, 341, 342, 475, 345; 455/522, 435, 455/432, 3.01, 3.02, 466, 503, 572, 69, 436, 455/200, 412, 446, 449, 404, 425, 428, 437, 455/443, 459, 445, 518, 515, 509, 452, 502, 455/454, 517, 450, 442, 414, 551, 422; 713/163; 725/81; 709/223, 224, 238, 235, 217; 375/146, 375/130
See application file for complete search history.

(56) References Cited

U.S. PATENT DOCUMENTS

| | | | | |
|---|---|---|---|---|
| 6,108,545 A | * | 8/2000 | Keshavachar | 455/436 |
| 6,317,598 B1 | * | 11/2001 | Wiesen et al. | 455/443 |
| 6,393,281 B1 | * | 5/2002 | Capone et al. | 455/428 |
| 6,405,036 B1 | * | 6/2002 | Almgren et al. | 455/425 |
| 6,845,238 B1 | * | 1/2005 | Muller | 455/436 |
| 2002/0034184 A1 | * | 3/2002 | Du | 370/395.1 |
| 2002/0106985 A1 | * | 8/2002 | Sato et al. | 455/3.01 |
| 2002/0115467 A1 | * | 8/2002 | Hamabe | 455/522 |
| 2002/0168945 A1 | * | 11/2002 | Hwang et al. | 455/69 |
| 2003/0040314 A1 | * | 2/2003 | Hogan et al. | 455/435 |
| 2003/0087637 A1 | * | 5/2003 | Masuda et al. | 455/437 |
| 2003/0088695 A1 | * | 5/2003 | Kwak et al. | 709/238 |
| 2003/0119452 A1 | * | 6/2003 | Kim et al. | 455/69 |
| 2003/0134622 A1 | | 7/2003 | Hsu et al. | |
| 2003/0157949 A1 | * | 8/2003 | Sarkkinen et al. | 455/503 |
| 2003/0207696 A1 | * | 11/2003 | Willenegger et al. | 455/522 |
| 2003/0231612 A1 | * | 12/2003 | Kim et al. | 370/342 |
| 2004/0103435 A1 | * | 5/2004 | Yi et al. | 725/81 |

(Continued)

FOREIGN PATENT DOCUMENTS

EP 1 006 740 A2 6/2000

(Continued)

*Primary Examiner*—Hong Cho
*Assistant Examiner*—Prenell P Jones
(74) *Attorney, Agent, or Firm*—Squire, Sanders & Dempsey L.L.P.

(57) ABSTRACT

The invention provides a method and system for providing multicasting content in a network having several cells which can communicate with one or more terminals such as user equipments, the terminals being able to select which cell or cells they desire to communicate which, wherein at least some of the cells transmitting multicasting content also transmit cell information on one or more other cells transmitting the same multicasting content, the terminal or terminals selecting one of the cells transmitting multicasting content which the terminal intends to receive, based on this information.

30 Claims, 3 Drawing Sheets

U.S. PATENT DOCUMENTS

| | | | |
|---|---|---|---|
| 2004/0266461 A1* | 12/2004 | Beckmann et al. | 455/466 |
| 2005/0021945 A1* | 1/2005 | Niemi et al. | 713/163 |
| 2005/0271007 A1* | 12/2005 | Hwang et al. | 370/329 |
| 2006/0030342 A1* | 2/2006 | Hwang et al. | 455/466 |
| 2006/0189272 A1* | 8/2006 | Willenegger et al. | 455/3.01 |

FOREIGN PATENT DOCUMENTS

| | | |
|---|---|---|
| EP | 1 326 462 A2 | 7/2003 |
| JP | 2005-516674 | 6/2005 |
| WO | WO 03/063418 | 7/2003 |

* cited by examiner

SYSTEM AND METHOD FOR PROVIDING SELECTION DIVERSITY FOR MULTICASTING CONTENT

FIELD AND BACKGROUND OF THE INVENTION

The present invention relates to a system and method for selection diversity for multicasting content e.g. in WCDMA. The term multicasting content means content intended for several users.

Further, the invention relates to a network entity such as a UE (User Equipment) e.g. a mobile phone intended to receive the multicasting content and including a selecting means or function.

The field of the invention is related to UMTS Terrestrial Radio Access (UTRA; UMTS=Universal Mobile Telecommunications System), e.g. to future releases such as release 6 of the 3GPP UTRA specifications (3GPP=3rd Generation Partnership Project).

For standardizing support for multicasting, MBMS (Multimedia Broadcasting/Multicasting Services), is discussed.

Multicast is based on FACH. Because Handover (HO) is not supported for FACH, there is no support for HO for multicast. For enabling multicast HO, BTS resynchronization might be considered, which may be difficult to implement.

SUMMARY OF THE INVENTION

The invention intends to solve the above problems and provides, according to one aspect, a method as defined in the independent method claim or any one of the dependent method claims.

According to a further aspect, the invention provides a system as defined in the independent system claim or any one of the dependent system claims.

Further, the invention provides a terminal as defined in the independent terminal claim or any one of the dependent terminal claims.

This invention proposes a method and system for handover, preferably soft handover (SHO), which do not require BTS resynchronization and do not impose any extra timing requirements for the terminal, e.g. user equipment (UE), or network.

The invention provides soft handover in case of multicasting transmission and associated benefits of the soft handover.

The proposed concepts allow handover for multicast, MBMS, with minimum additional network loading and uncomplicated structure from network and terminal, e.g. UE (User Equipment) perspective and do not require complicated timing control in the network.

One of the purposes of this invention is to present a system and method of providing soft handover for multicasting content. One of the preferred solutions is based on use of DSCH and selection diversity.

This invention allows a new macro diversity method that does not require Node B synchronization, to be used for transmitting and receiving multicast content, i.e. multicast messages.

With a traditional maximal ratio combining method, soft handover would require that links are time aligned in the downlink transmission. This can be done for dedicated channels but with multicasting content the problem is that all UEs in the network are to be considered for this and thus the synchronisation requirements can be very tight with large cell deployment.

Previously, only dedicated channels have been considered in the soft handover and individual UE has controlled the timing of the radio links. This is different when several UEs are supposed to receive the same content.

The invention also provides the advantage of better performance for the current broadcast solutions. For the proposed "full" macrodiversity, no new synch is required.

In accordance with one or some of the embodiments of the invention, DSCH (Downlink Shared Channel) is used for multicasting. The data needs to be sent when there is DCH (Dedicated Channel) which is indicated to be related to the DSCH in question.

The invention is applicable preferably to CDMA (Code Division Multiple Access) or WCDMA (Wideband Code Division Multiple Access) but also to other network types as well.

DETAILED DESCRIPTION OF PREFERRED EMBODIMENTS OF THE INVENTION

Figure 1:
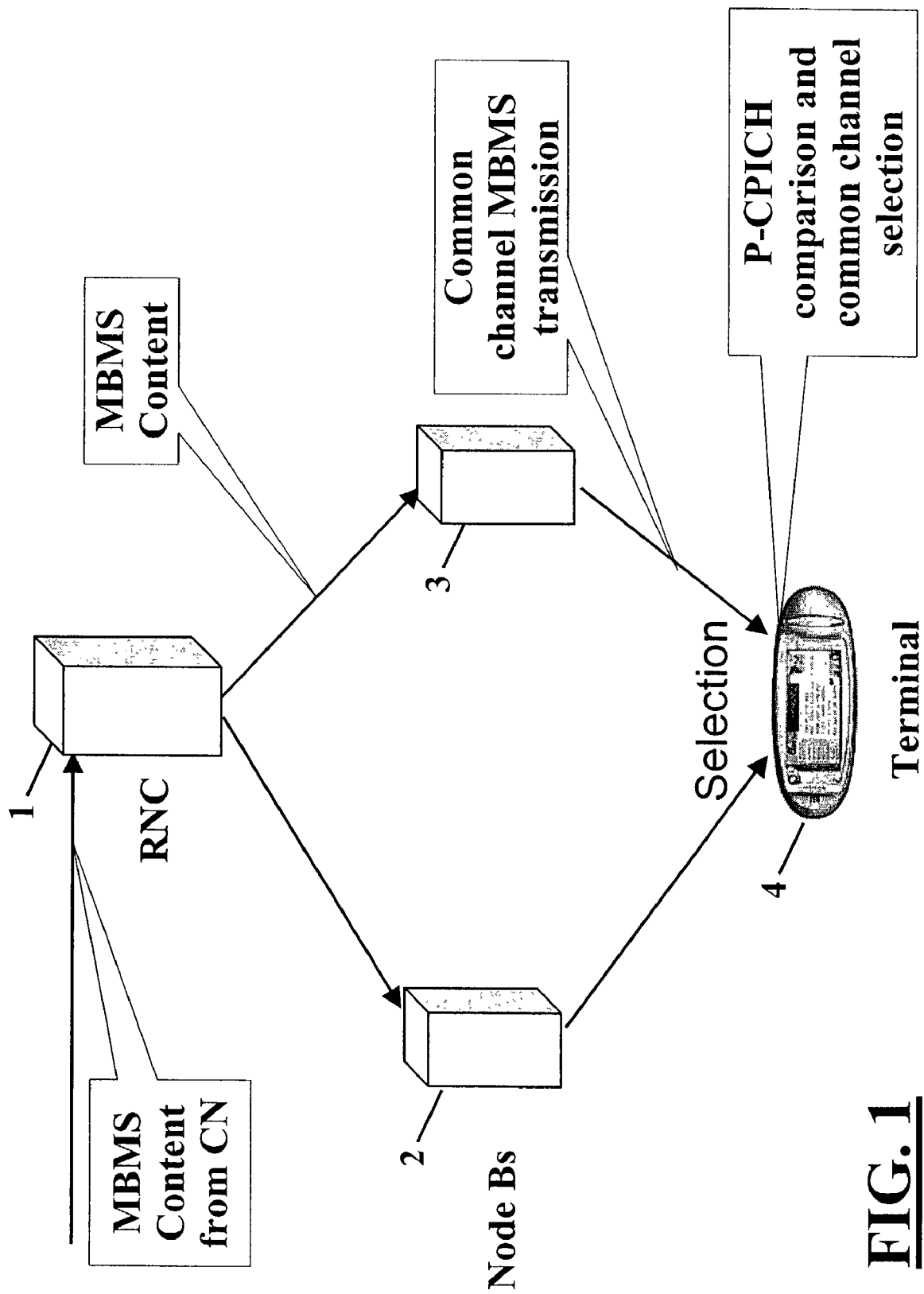
FIG. 1 shows a system for providing selection diversity for multicast service, in accordance with an embodiment of the invention.

In accordance with a basic first part of embodiments of the invention, multicast messages are sent in DSCH (Downlink Shared Channel) instead of FACH (Forward Access Channel). Previously, terminal, such as user equipments (UE), listened to DSCH only from that BTS that the UE could hear best, and RNC has sent DSCH only to that particular BTS.

In one of the presented preferred solutions which is applicable to all other presented solutions as well, RNC sends multicast content in DSCH for many base stations, e.g. Nodes B or BTSs (Base Transceiver Stations), each of which will broadcast the DSCH. The terminal, e.g. UE selects the DSCH that it can hear best. A benefit is that HO is possible in multicast.

DCH is associated for each DSCH separately for each UE. In a more advanced embodiment, i.e. an extended version, the DCHs are observed by a network element, such as a base station BTS transmitting the DCHs, or another network element such as the radio controller RNC. This or another network element, e.g. the BTS, will be able to stop sending those DSCH's that are not listened to by any UE. In this extended version, the knowledge of the presence of any associated DCH in BTS is used. The relation between DCH and DSCH is as follows. A UE is not capable of receiving DSCH without receiving also associated DCH, hence if no associated DCHs for a given DSCH exist, no one is receiving that DSCH. It must be noted, however, that there can be also DCHs that do not associate to DSCH and due to this there can be active DCHs in a cell. As long as none of the active DCHs is associated to the DSCH, the DSCH multicasting can be suspended.

If no associated DCHs are present, there are no users receiving the DSCH, hence no need to transmit the DSCH. Thus, a (or at least one) network element such as the radio network controller, RNC, or the transmitting element, preferably the BTS, stops the transmission of the DSCH if there is no DCHs associated to the DSCH, that is the DSCH is not listened to by any terminal. This possibility of monitoring DCHs and stopping the transmission is one benefit for using DSCH for multicast. Another benefit for using DSCH is that DSCH is point-to-multipoint.

The invention includes several levels of possible implementation:
  usage of DSCH;
  usage of DSCH and selection diversity;
  usage of DSCH, selection diversity plus shutting down unused DSCH's, and
  usage of FACH, i.e. 'normal' MBMS transmission mode and selection diversity.

In any case one of the key ideas of the invention is that in case of multicast content, information (cell information, which may be transmitted in SIBs, DCCH=Dedicated Control Channel, etc . . . ) is provided also on the other cells that have the same multicast content being transmitted, and on the necessary parameters such as spreading code in the other cells which parameters allow the terminal to decode the multicast content from the other cells. The terminal is allowed to select independently which cell to receive.

The benefits are high performance. Further, as the information is available in advance, it is not necessary to read broadcast information (SIBs) before the service reception can continue (after a cell reselection when the user has moved to another cell)

The channels that can be used for this preferably are the FACH and DSCH (Downlink Shared Channel), which may have some more detailed issues such as:
  With DSCH sending the same DSCH from multiple cells and received by multiple users. (as in the past DSCH is sent from one cell to a single user only (at the time).
  With FACH when sending the channel together with a DCH existing, the base station can be informed which DCHs are related to the FACH (MBMS) reception and when informed, the base station can then adjust the transmission power based e.g. on:
  DCH powers;
  Presence of the associated DCH channels (as users come and go);
  Uplink feedback information such as SSDT (feature which indicates in the uplink which cell is the best for the DCH transmission, e.g. SSDT uplink feedback information indicating the primary/non-primary cell status) now can be considered for FACH (MBMS) transmission as well by not transmitting or reducing the TX (Transmit) power if all terminals indicate some other cell as non-primary. (Terminals send with SSDT indication in the uplink which cell is the strongest) (SSDT=Site-Selection Diversity Transmission).

The invention may use the DSCH (Downlink Shared Channel) to provide the multicasting content to several users, with the features being added to support soft handover as follows:
  DSCH has now content intended for several users. This may be implemented e.g. with only small protocol level modifications;
  DSCH is sent from several Node Bs with the same MBMS content and now the terminal selects based on e.g. CPICH signal strength which DSCH to receive. Here the split mode for TFCI can be used as well. This is selection based diversity and not part of the customary DSCH operation.
  Node B is informed of multiple DCHs that are related to the multicasting DSCH and in case the handover situation is such that none of the DCHs are any longer active then DSCH does not need to be transmitted, and transmission thereof can be stopped by Nodes B.

An alternative is to consider the use of FACH with a selection principle in case the number of UEs is high and it is desired not to have all UEs with DCH. This also allows to reduce the FACH power level for multicasting.

Figure 2:
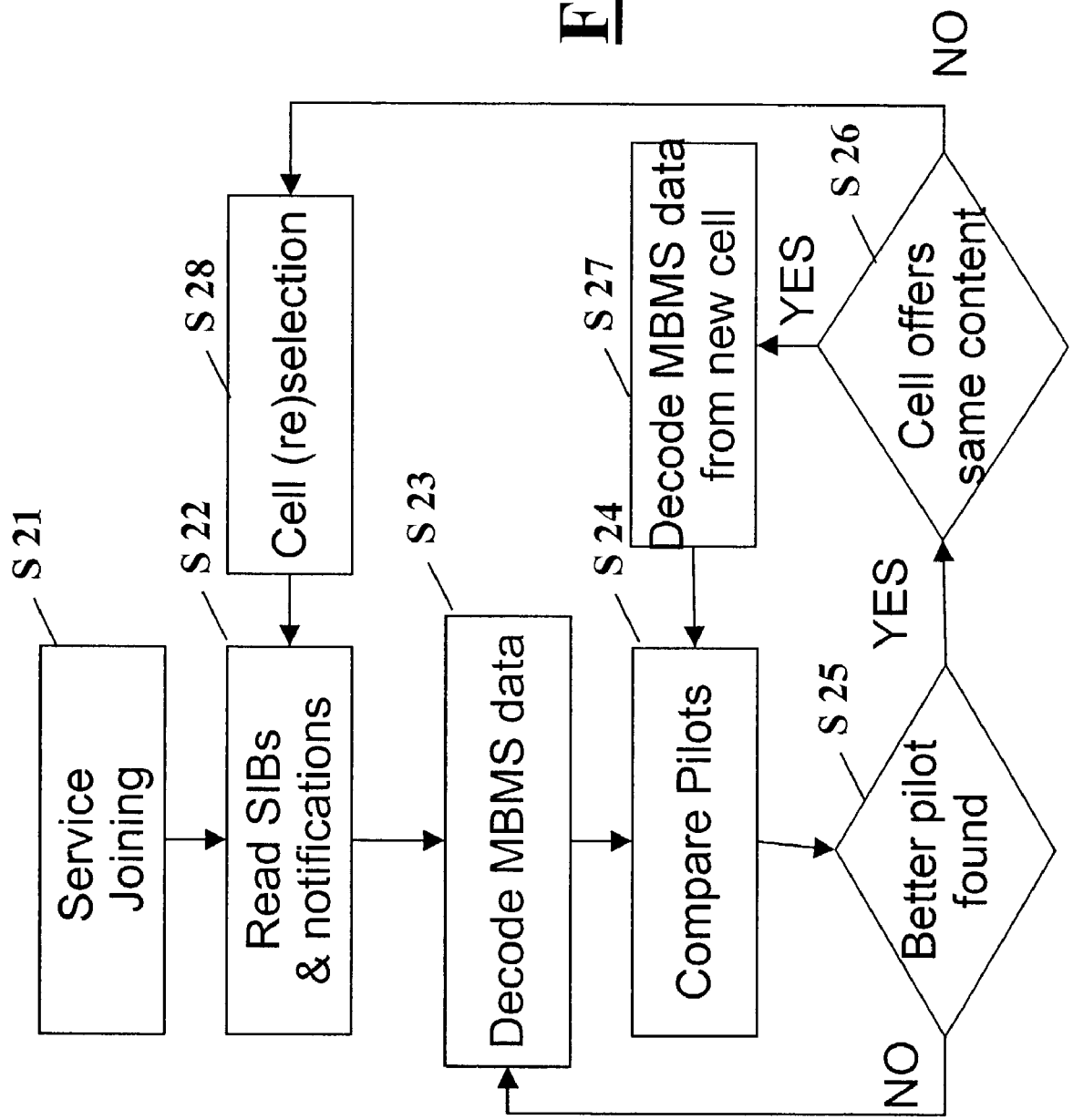
FIG. 2 illustrates a flow chart of a decision process implemented in an embodiment of the invention such as a system, method or a terminal of a subscriber.
Figure 3:
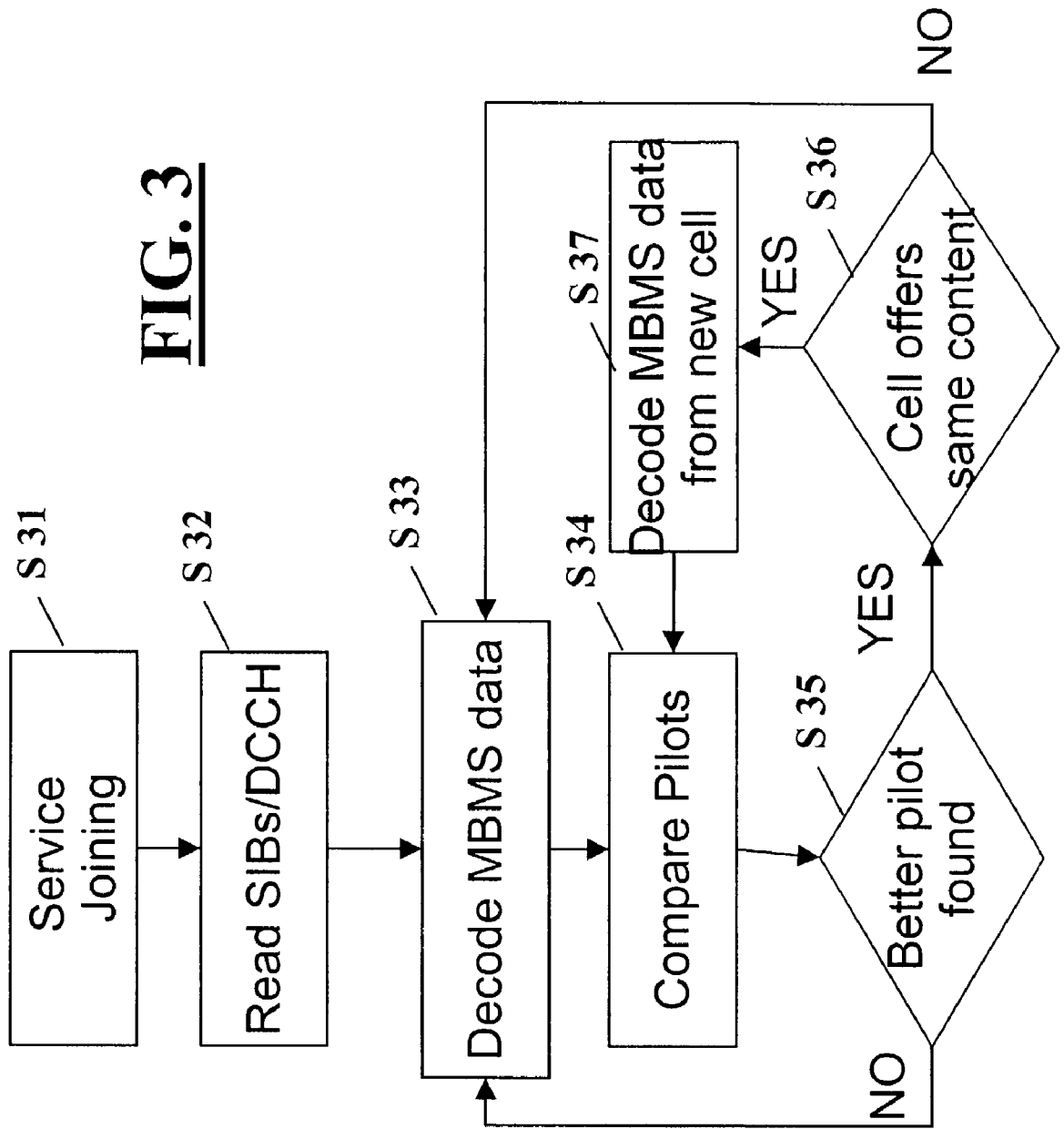
FIG. 3 illustrates a further flow chart of a decision process implemented in another embodiment of the invention such as a system, method or a terminal of a subscriber.

FIGS. 1 to 3 provide further details of embodiments of the invention regarding the use of selection diversity. The embodiments illustrate handover aspects in selection diversity of multicast messages, e.g. transmitted via MBMS as an example.

FIG. 1 illustrates a first embodiment of a method and system in accordance with an embodiment of the invention. This embodiment is adapted to provide selection diversity in UTRAN for MBMS.

MBMS content, i.e. the content of one or more multicast messages, is sent from a core network (CN) to one or several transmission controllers such as BSCs (Base Station Controllers) or RNC (Radio Network Controllers) 1. The controllers 1 transmit this MBMS content to one or more radio transmitters 2, 3 such as BTSs or Nodes B. All transmitters 2, 3 receiving this MBMS content transmit this content, i.e. the multicast messages, to one or more terminals 4 via Common channel MBMS transmission. The terminal or terminals 4 perform a selection e.g. by performing a comparison of pilot signals on the common pilot channel (CPICH), preferably the P-CPICH (Primary Common Pilot Channel), and a selection of one of the common channels, preferably the strongest common channel, based on the result of this CPICH, or P-CPICH, comparison.

FIGS. 2 and 3 show flow charts of a routine implemented in embodiments of one or more terminals 4, e.g. UE, and a method in accordance with the present invention. In detail a decision process performed in the terminal or terminals 4 is shown.

The RAN (Radio Access Network), e.g. Base transceiver station (BTS) or Node B 2, 3, transmits System Information Blocks (SIBs) which contain Cell information including the channelisation code, e.g. the spreading code, with regard to each of the cells which transmit the same MBMS content. The SIBs are preferably transmitted on the broadcast channel in the cell. This information can also be transmitted on other channels as well.

The cell selection/re-selection is not service driven in the embodiment.

Existing cell selection rules are not violated.

In the embodiment shown in FIG. 2, the FACH (Forward Access Channel) is used for transmitting the System Information Blocks (SIBs). The FACH can also be used in some or all of the other embodiments.

In step S21, a terminal 4, e.g. a UE, decides to join a multicast service and registers thereto(Service Joining). The terminal 4 reads SIBs and notifications transmitted on the broadcast channel, step S22. The notifications may also be sent on another channel. The SIBs contain cell information including the channelisation code with regard to each of the cells which transmit the same MBMS content. The terminal 4 decodes received multicast messages (Decode MBMS data), step S23.

In step S24, pilot signals received from different cells are compared for detecting a better channel, e.g. a channel received with more power or less errors etc. As an example, the strength or error-freeness of received pilots are compared to each other so as to find one or more pilot signals received with higher strength or reduced error rate etc. In step S25, a decision is performed. When no better, e.g. stronger pilot (signal) has been found in step S24, the routine loops back to step S23 so that steps S23, S24, S25 are repeatedly executed.

When a better, e.g. stronger pilot (signal) has been found in step S24, the routine proceeds from step S25 to step S26 where it is checked whether or not the cell having the detected better or best (strongest or least error) pilot offers the same multicasting content, i.e. provides the same multicast service selected by the user in step S21 and offered by the cell actually listened to by the terminal 4.

When the answer to step S26 is yes, the routine moves to step S27. There, MBMS data from the new cell sending the detected stronger or better pilot signal are decoded. The terminal 4 thus has made a handover to, i.e. switched to, the new cell for receiving the multicast messages.

The routine may preferably loop back through a loop from step S27 back to the comparing step S24 and decision step S25 for continuously or repeatedly detecting any even stronger or better pilot signal, e.g. in case of movement of the terminal 4.

When the system detects, in step S26, that the cell transmitting the pilot signal received better by the terminal, does not offer the same multicast content, a cell reselection function or means may be activated, step S28. The new cell received better by the terminal 4 may be instructed, by the network management or a controller to transmit additionally the MBMS content which the terminal 4 wants to receive. The SIBs are adapted accordingly so as to additionally include or indicate the cell information including the channelisation code of the new cell. The process proceeds from step S28 back to step S22 wherein SIBs are read again by the terminal 4 which then preferably is instructed to select the new cell for decoding the multicast messages, MBMS data. As an alternative, the program may also omit the return to step S22 after effecting the cell reselection process or step S28, and directly instruct the terminal 4 to select the new cell for decoding the multicast content from the new cell. Thereafter, the steps S24, S25 etc are carried out again as described above.

The embodiment shown in FIG. 3 has a structure where there is a dedicated channel, DCH, and MBMS content is sent in parallel from the cells in the DCH active set (not necessary from all) on DSCH (Downlink shared channel) or FACH. FIG. 3 relates to a terminal decision process with DCH active.

The network transmits the cell information on the cells (in the active set) that transmit the same MBMS content (including the spreading codes etc.). This information can be transmitted in SIBs or DCCH (dedicated control channel).

The steps S31 to S37 shown in FIG. 3 are mostly similar to the steps S21 to S27 of FIG. 2. The above description of these steps therefore also applies to steps S31 to S37, with the following exceptions. In step S32, SIBs or the information sent on DCCH is read by the terminal 4 for detecting the information on the cells (in the active set) that transmit the same MBMS content (including the spreading codes etc.).

In step S36, when detecting that the cell transmitting the pilot signal received better by the terminal 4 does not offer the same multicast content which the terminal 4 wants to receive, the program routine proceeds to step S33 so that the MBMS multicast messages are read again from the same cell as before. Hence, no cell reselection is performed by the terminal 4.

However, if there is better pilot found in step S36 and the new cell transmitting this better pilot is not in the active set, normal reporting and mobility management rules can be used, e.g. for updating the active set so as to include the new cell as well. Thus active set update is likely. After such update, when looping again through steps S34, S35, S36, the answer in step S36 will become yes, with subsequent switching to step S37, i.e. decoding the MBMS data from the new cell.

The embodiments thus provide Selection Diversity, e.g. in UTRAN for MBMS.

In accordance with embodiments of the invention, some preferred terminal functions or functionality for multicast selection diversity and handover (HO), e.g. for MBMS HO, include:

Selection of the strongest common channel (selection based e.g. on P-CPICH); e.g. either DSCH or FACH may be used;

Receiving during selection diversity process two common channels in asynchronous network (at least during the switching process for the duration of the timing difference, if the stronger cell is more advanced in the SFN timing). This is an optional feature, and may or may not be implemented depending e.g. on QoS (Quality of Service) requirement. When one or more 10 ms frame losses are acceptable (if e.g. Node B timing is within 10 ms), no parallel receipt of two common channels is necessary. There will usually be some frame losses in any case;

Decoding the related SIBs that inform the terminal 4 which Node Bs transmit the data.

Previously there was no requirement for parallel DCH/FACH reception. If a terminal nevertheless can receive DCH/FACH simultaneously, then reception of two FACHs does not increase complexity. Otherwise, the terminals may be adapted to be able to receive DCH/FACH in parallel. IF the MBMS content is considered in the DCH/DSCH case or also in DCH/FACH case, then the terminal is adapted to receive DCH plus two common channels (for a while). This requirement can be removed if the network is within Node B timing, e.g. 10 ms timing, for the MBMS transmission and 1 frame loss due switching is acceptable. Then the requirements for reception resources are the same as with a DCH/FACH or DCH/DSCH capable terminal.

For the selection diversity the P-CPICH is preferably measured. Extra processing may be provided depending on the requirements. If the requirements are at similar level, or do not exceed, the requirements set for SSDT feature, no added complexity results. A terminal 4 may at one time monitor the P-CPICH from up to 6 cells, taking into account the cells which are in the active set for DCH, which are assumed to be contained in the 6 cells surrounding the terminal 4, and to be considered.

Reception of DCH+MBMS content simultaneously is a UE capability.

In accordance with embodiments of the invention, preferred network functionality for multicast handover, e.g. MBMS HO, includes:

New Node B functions for MBMS in selection diversity are unnecessary; only possible timing issues as follows.

With 10 ms timing assumption, then MBMS content is preferably time aligned either in the RNC or in the Node B (both means some buffer as some delay needs to be introduced).

In general all the cells that can provide MBMS content have the corresponding RNC with MBMS content available.

Although preferred embodiments have been described above, the invention is not limited thereto and may also be implemented in other ways, e.g. by combining, in any arbitrary fashion, one or more features of one or more embodiments with one or more features of other embodiments.

The invention claimed is:

1. A method, comprising:
transmitting a multicasting content by multiple cells; and
transmitting cell information, by at least one of said multiple cells, on one or more other cells, wherein said cell information indicates which cells transmit the same multicasting content.

2. The method according to claim 1, wherein the cell information is transmitted as system information blocks.

3. The method according to claim 1, wherein the cell information is transmitted on broadcast channels in the cells.

4. The method according to claim 1, wherein the cell information is transmitted on a dedicated control channel.

5. The method according to claim 1, wherein the cell information comprises channelization codes with regard to each of the cells which transmit the same multicasting content.

6. The method according to claim 1, wherein at least two of the cells send the same multicasting content on a forward access channel to at least two terminals.

7. The method according to claim 1, wherein base stations of the cells are informed on dedicated channels related to forward access channels used for transmitting multicast content.

8. The method according to claim 7, wherein base stations of the cells adjust transmission power based on
detected dedicated channel powers, or
presence of the associated dedicated channels, or
site-selection diversity transmission uplink feedback information indicating the primary/non-primary cell status.

9. A method, comprising:
receiving cell information from at least two cells;
wherein said cell information indicates which cells transmit same multicasting content,
comparing quality of reception from said at least two cells; and
selecting at least one cell from which to receive a multicasting content based at least in part on the cell information.

10. The method according to claim 9, wherein a user terminal is configured to compare strength or power of pilot signals received from said at least two cells, to select at least one cell based on said strength or power, to check whether said selected at least one cell offers the multicasting content, and to start decoding the multicasting content if said selected at least one cell offers the same multicasting content.

11. The method according to claim 10, wherein said user terminal is configured to initiate a reselection procedure if the selected at least one cell does not offer the same multicasting content.

12. The method according to claim 9, wherein said user terminal is configured to compare strength or power of pilot signals received from said at least two cells on a primary common pilot channel.

13. A system, comprising:
a network;
cells of the network configured to communicate with the one or more terminals, wherein the system is configured to provide multicasting content in the network,
at least one of the cells is configured to transmit multicasting content and cell information on one or more other cells transmitting the same multicasting content,
the cell information is configured to indicate which cells are transmitting the same multicasting content.

14. The system according to claim 13, wherein the system is configured to transmit the cell information as system information blocks.

15. The system according to claim 13, wherein the system is configured to transmit the cell information on broadcast channels in the cells.

16. The system according to claim 13, wherein the system is configured to transmit the cell information on a dedicated control channel.

17. The system according to claim 13, wherein the cell information comprises channelization codes with regard to each of the cells which transmit the same multicasting content.

18. The system according to claim 13, wherein at least two of the cells are configured to send the same multicasting content on a forward access channel.

19. The system according to claim 13, wherein base stations of the cells are informed of dedicated channels related to forward access channels used for transmitting multicast content.

20. The system according to claim 19, wherein base stations of the cells adjust transmission power based on
detected dedicated channel powers, or
presence of the associated dedicated channels, or
site-selection diversity transmission uplink feedback information indicating the primary/non-primary cell status.

21. An apparatus, comprising:
a receiver configured to receive multicasting content from one or more cells in a network and to receive cell information from at least one cells, wherein said cell information indicates which cells transmit the same multicasting content; and
a processor configured to select at least one cell, from said one or more cells, from which to receive the multicasting content the terminal is interested in based at least in part on said cell information.

22. The apparatus according to claim 21, wherein the apparatus is configured to compare quality of reception from at least two cells, and to select at least one cells for receiving the multicasting content based at least in part on said quality of reception.

23. The apparatus according to claim 22, wherein the apparatus is configured to compare strength or power of pilot signals received from said at least two cells, to select at least one cell based on said strength or power, to check whether said selected at least one cell offers the multicasting content, and to start decoding the multicasting content if the selected at least one cell offers the multicasting content.

24. The apparatus according to claim 23, wherein the apparatus is configured to initiate a cell reselection procedure if the selected at least one cell does not offer the same multicasting content.

25. The apparatus according to claim 23, wherein the apparatus is configured to compare strength or power of pilot signals received from said at least two cells on a primary common pilot channel.

26. An apparatus, comprising:
receiving means for receiving multicasting content in a network having cells that can communicate with the apparatus; and
selecting means for selecting at least one cell to communicate with based on cell information transmitted from the cells and for indicating the cells that are transmitting the same multicasting content, wherein the selecting means is configured to select one of the cells transmitting multicasting content.

27. The apparatus according to claim 21, wherein the cell information is received as system information blocks.

28. The apparatus according to claim 21, wherein the cell information is received on broadcast channels in the cells.

29. The apparatus according to claim 21, wherein the cell information is received on a dedicated control channel.

30. The apparatus according to claim 21, wherein the cell information comprises channelization codes with regard to each of the cells which transmit the same multicasting content.

* * * * *